US007616412B2

(12) United States Patent
Zhu et al.

(10) Patent No.: US 7,616,412 B2
(45) Date of Patent: Nov. 10, 2009

(54) PERPENDICULAR SPIN-TORQUE-DRIVEN MAGNETIC OSCILLATOR

(75) Inventors: Xiaochun Zhu, Pittsburgh, PA (US); Jian-Gang Zhu, Pittsburgh, PA (US)

(73) Assignee: Carnegie Melon University, Pittsburgh, PA (US)

( * ) Notice: Subject to any disclaimer, the term of this patent is extended or adjusted under 35 U.S.C. 154(b) by 523 days.

(21) Appl. No.: 11/490,882

(22) Filed: Jul. 21, 2006

(65) Prior Publication Data

US 2008/0019040 A1 Jan. 24, 2008

(51) Int. Cl.
*G11B 5/39* (2006.01)

(52) U.S. Cl. .................................................. 360/324.2

(58) Field of Classification Search ....................... None
See application file for complete search history.

(56) References Cited

U.S. PATENT DOCUMENTS

| | | | | |
|---|---|---|---|---|
| 7,443,639 | B2 * | 10/2008 | Parkin | 360/324.2 |
| 7,471,491 | B2 * | 12/2008 | Sato et al. | 360/313 |
| 2006/0039089 | A1 | 2/2006 | Sato | |
| 2006/0097807 | A1 | 5/2006 | Mage et al. | |
| 2006/0221507 | A1 * | 10/2006 | Sato et al. | 360/324 |

OTHER PUBLICATIONS

S. Kaka et al., "Mutual phase-locking of microwave spin torque nano-oscillators," Nature, vol. 437, Sep. 2005, pp. 389-392.

A. Rebei et al., "Fluctuations of the magnetization in thin films due to conduction electrons," Physical Review B, vol. 71, Issue 17.

M.A. Hoefer et al., "Theory of Magnetodynamics Induced by Spin Torque in Perpendicularly Magnetized Thin Films," Physical Review Letters (PRL) 95, 267206 (2005).

* cited by examiner

*Primary Examiner*—Mark Blouin
(74) *Attorney, Agent, or Firm*—K&L Gates LLP

(57) ABSTRACT

A perpendicular spin-torque-driven magnetic oscillator is disclosed. According to various embodiments, the magnetic oscillator comprises a magnetic reference stack, a magnetic oscillating stack, and an interlayer between the reference stack and the oscillating stack such that the reference stack and the oscillating stack are exchange coupled. The reference stack may have sufficient perpendicular anisotropy such that it causes, via the spin momentum transfer effect, the spin polarization of the conducting electrons in the oscillating stack to produce a spin torque on the local magnetization of the oscillating layer. As such, the oscillating stack may produce a sustained gyromagnetic oscillation around the perpendicular axis of the oscillating stack when (i) the oscillating stack and the reference stack have opposite magnetizations and (ii) there is a direct current flowing in the magnetic oscillator from the oscillating stack to the reference stack. Also, the oscillating stack may produce a sustained gyromagnetic oscillation when (i) the oscillating stack and the reference stack are magnetized in the same direction and (ii) there is a direct current flowing in the magnetic oscillator from the reference stack to the oscillating stack.

32 Claims, 9 Drawing Sheets

PERPENDICULAR SPIN-TORQUE-DRIVEN MAGNETIC OSCILLATOR

BACKGROUND

The present invention relates generally to oscillators and, more particularly, to magnetic field oscillators.

Crystal (e.g., quartz) oscillators are a common source of time and frequency signals for electronic circuitry. Unfortunately, however, the fabrication of crystal oscillators is not usually compatible with solid state circuitry fabrication processes, and in particular CMOS fabrication processes. Accordingly, there exists a need for an oscillator whose fabrication is compatible with solid state circuitry fabrication processes, but which provides the timing performance of crystal oscillators.

SUMMARY

In one general aspect, the present invention is directed to a perpendicular spin-torque-driven magnetic oscillator. According to various embodiments, the magnetic oscillator comprises a reference stack, an oscillating stack, and an interlayer between the reference stack and the oscillating stack such that the reference stack and the oscillating stack are exchange coupled. The reference stack may have a sufficient perpendicular anisotropy such that the reference stack causes, via the spin momentum transfer effect, the spin polarization of the conducting electrons in the oscillating stack to produce a spin torque on the local magnetization of the oscillating stack. As such, the oscillating stack may produces a sustained gyromagnetic oscillation around the perpendicular axis of the oscillating stack when (i) the oscillating stack and the reference stack have opposite magnetizations and (ii) there is a direct current flowing in the magnetic oscillator from the oscillating stack to the reference stack. Also, the oscillating stack may produce a sustained gyromagnetic oscillation when (i) the oscillating stack and the reference stack are magnetized in the same direction and (ii) there is a direct current flowing in the magnetic oscillator from the reference stack to the oscillating stack.

Advantageously, the gyromagnetic oscillation of the inventive perpendicular, spin-torque-driven magnetic oscillator may have a very high quality factor (Q), such as Q>1000, with oscillations in the microwave frequency range (e.g., 8 to 35 GHz). Also, the magnetic oscillator may be formed using conventional CMOS fabrication techniques, making it easier to integrate with peripheral CMOS circuitry.

In various implementations, the magnetic oscillator may comprise a sensor for sensing either voltage or current. The sensor stack may comprise a synthetic anti-ferromagnetic (SAF) reference layer and an anti-ferromagnetic (AFM) layer for pinning the SAF layer. Because the magnetic gyromation of the oscillating stack is around the perpendicular axis of the oscillating stack, the magnetization of the SAF reference layer is preferably perpendicular to the perpendicular axis of the oscillating stack (i.e., along the horizontal axis of the SAF reference layer). In addition, the oscillating stack may further comprise a TMR enhancing layer.

In another general respect, the present invention is directed to a magnetic write head that includes the inventive perpendicular, spin-torque-driven magnetic oscillator.

FIGURES

Various embodiments of the present invention are described herein by way of example in conjunction with the following figures.

Figure 11:
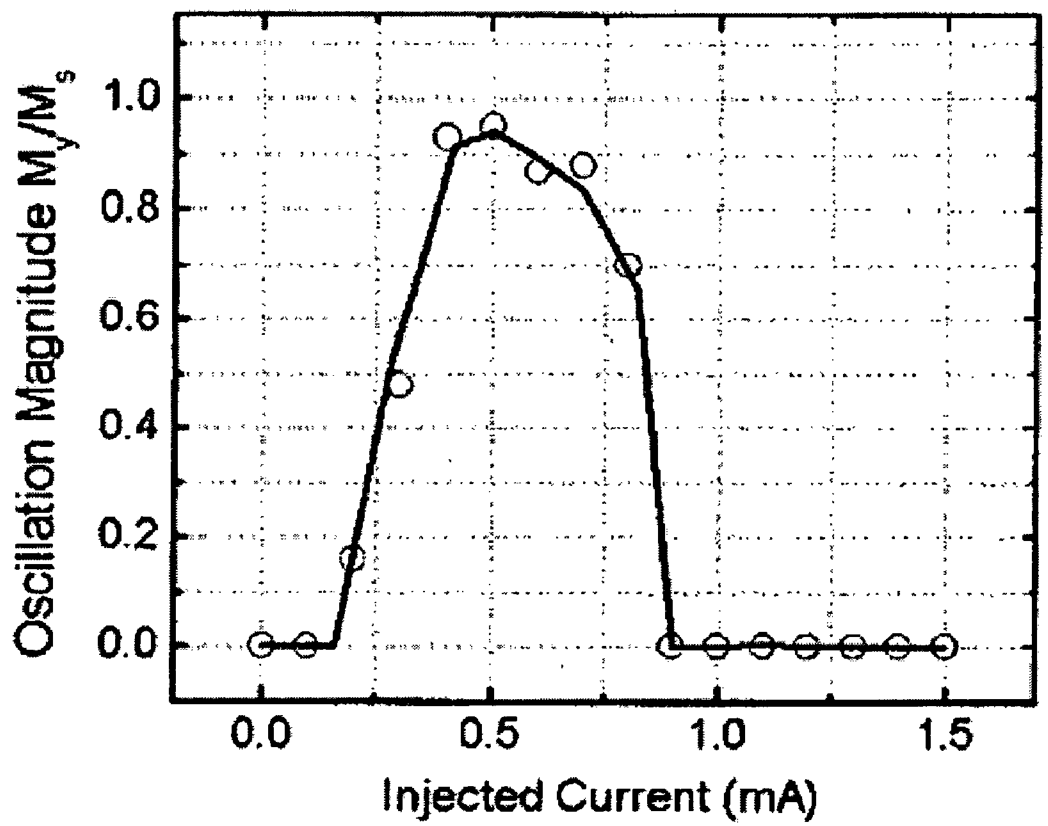
Figure 12:
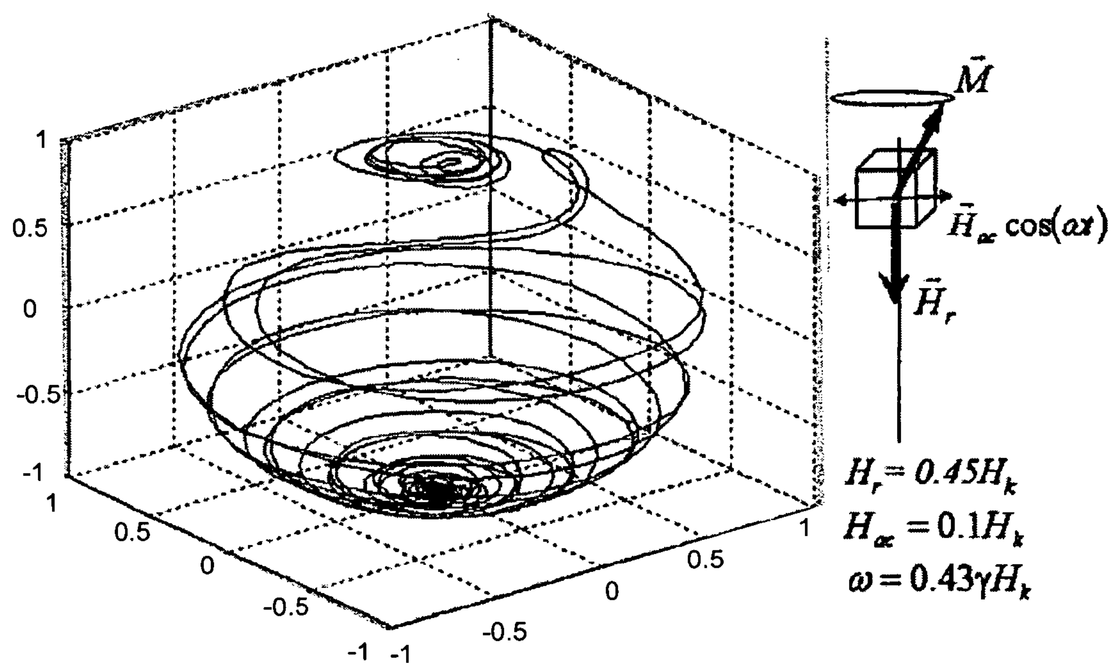

FIG. 11 is a graph showing the calculated amplitude of the magnetization component perpendicular to the air-bearing-surface (ABS) of the magnetic recording medium in the field generation layer as a function of the injected current level according to an embodiment of the present invention; and FIG. 12 is a graph showing the magnetization reversal with an ac field at a particular frequency applied transverse to the anisotropy easy axis of the magnetic layer of the oscillating stack of the magnetic oscillator according to one embodiment of the present invention.

DETAILED DESCRIPTION

Figure 1B:
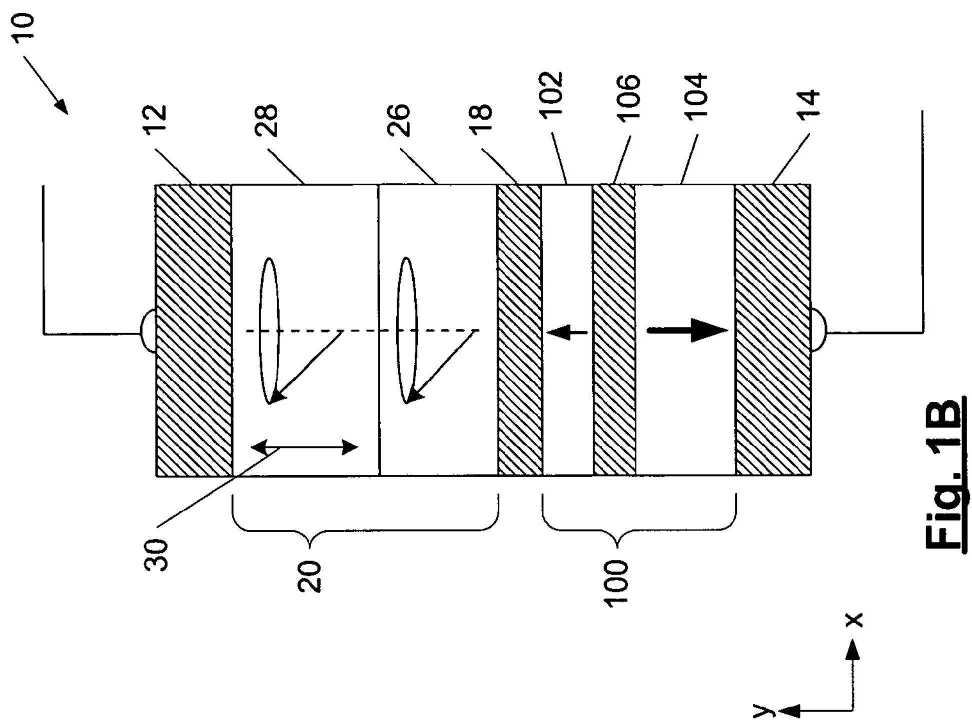
FIGS. 1A to 1D are cross-sectional side views of a magnetic oscillator according to various embodiments of the present invention.
Figure 1A:
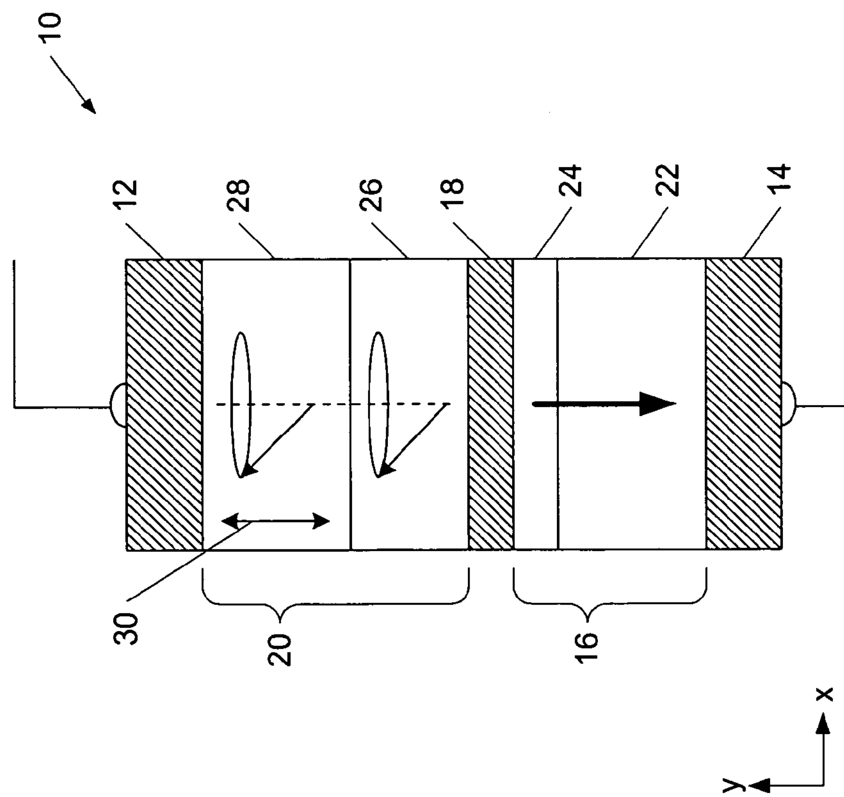
Figure 1D:
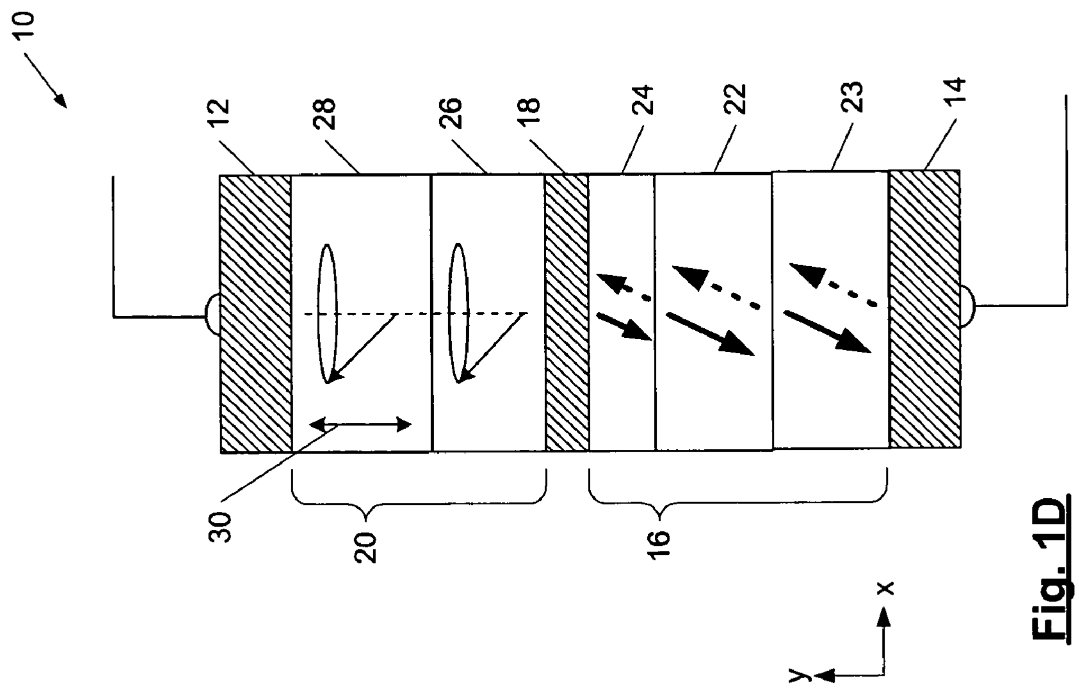
Figure 1C:
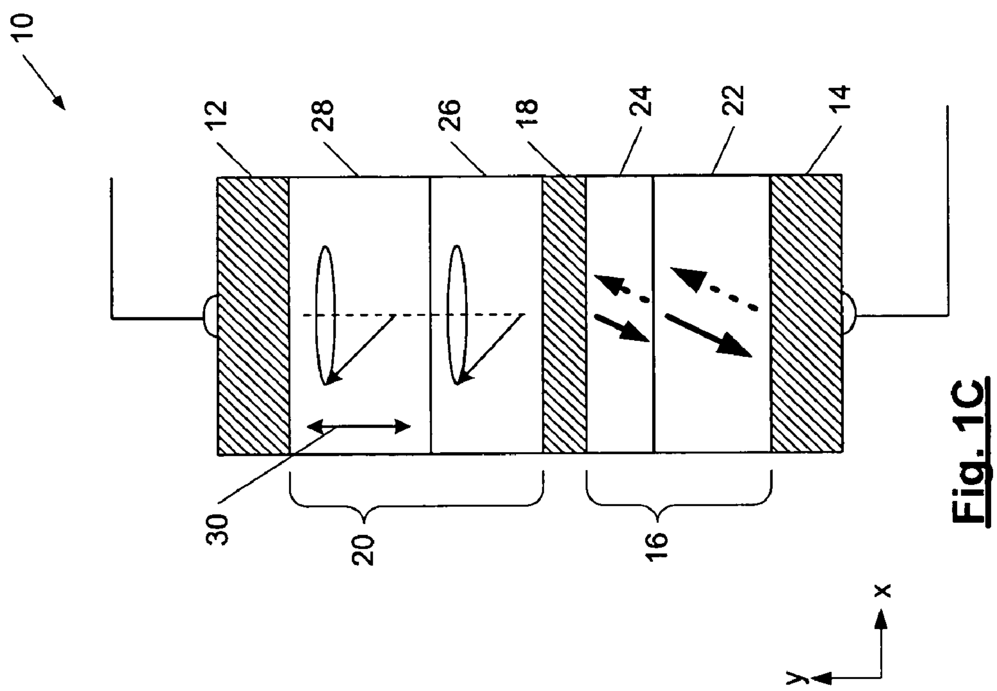

FIGS. 1A-1D are cross-sectional side views of a magnetic oscillator 10 according to various embodiments of the present invention. In each illustrated embodiment, the magnetic oscillator 10 may comprise an upper electrode 12 and a lower electrode 14. Between the two electrodes 12, 14 are a magnetic reference stack 16, an interlayer 18, and a magnetic oscillating stack 20. The magnetic reference stack 16 may be magnetically exchange coupled to the magnetic oscillating stack 20. Also, the reference stack 16 may have sufficient perpendicular (i.e., perpendicular to the plane of the layers of the reference stack) magnetic anisotropy such that stable magnetization precession of the oscillating stack 20 can be achieved when current is injected into the magnetic oscillator via the electrodes 12, 14. As described in more detail below, the magnetization of the reference stack 16 can be either substantially perpendicular (±y direction) as shown in FIGS. 1A-1B, or comprise both perpendicular and in-plane (±x direction) components as shown in FIGS. 1C-1D, so long as there is sufficient perpendicular magnetic anisotropy to produce the magnetization precession of the oscillating stack 20 when the appropriate current is injected into the magnetic oscillator 10. According to various embodiments, the magnetic oscillator 10 may be cubic or cuboid in nature, but other 3d geometries may also be used.

In the embodiment of FIG. 1A, the reference stack 16 comprises a magnetic layer 22 and a relatively thinner spin torque enhancing layer 24. The magnetic layer 22 may have a material-intrinsic perpendicular anisotropy, in this example in the −y direction with respect to the Cartesian coordinate system shown in FIG. 1A. In other embodiments, the magnetic layer 22 may be polarized in the +y direction. The magnetic layer 22 may be comprised of a magnetic material, such as a cobalt alloy, for example, and may have a thickness of twenty (20) to fifty (50) nm. The spin torque enhancing layer 24 is exchange coupled to the magnetic layer 22 so that the magnetization of the spin torque enhancing layer 24 follows that of the magnetic layer 22 (i.e., the −y direction in this example). The spin torque enhancing layer 24 may be fabricated from CoFe, for example, and may have a thickness of five (5) to twenty (20) nm.

The interlayer 18 may comprise, for example, an electrically conductive/magnetically non-conductive material such as, for example, copper, and may have a thickness of, for example, ten (10) nm or less. According to other embodiments, the interlayer 18 may comprise a thin tunnel barrier layer of an electrically insulating material, such as $AlO_x$ or MgO, for example.

The oscillating stack 20 may comprise a spin torque driven layer 26 and a magnetic layer 28. The magnetic layer 28 may be thicker (in the y direction in the Cartesian coordinate system of FIG. 1) than the spin torque driven layer 26. For example, the magnetic layer 28 may have a thickness of twenty (20) to fifty (50) nm, and the spin torque driven layer 26 may have a thickness of five (5) to twenty (20) nm. Also, the magnetic layer 28 preferably has a strong material-intrinsic magnetic anisotropy with a perpendicular easy axis 30 to keep the magnetization of the magnetic layer 28 uniformly oriented in the direction perpendicular (either up or down) to the plane of the layer 28. The spin torque driven layer 26 is exchange coupled to the magnetic layer 28 so that the magnetization of the spin torque driven layer 26 follows that of the magnetic layer 28.

The reference stack 16 may cause the spin polarization of conducting electrons in the oscillating stack 20 to yield a spin torque on the local magnetization of the oscillating stack 20 via the effect of spin momentum transfer. As a result, when the oscillating stack 20 and the reference stack 16 are magnetized perpendicularly but in opposite directions (e.g., when the magnetization of the oscillating stack 20 is in the +y direction and the magnetization of the reference stack 16 is in the −y direction), a direct current flowing in the direction from the oscillating stack 20 to the reference stack 16 (i.e., in the −y direction) yields a sustained gyromagnetic oscillation of the magnetization in the oscillating stack 20, including both the magnetic layer 28 and the spin torque driven layer 26, over a certain range of the current magnitude. When the oscillating stack 20 and the reference stack 16 are magnetized in the same direction (e.g., in the −y direction), a direct current flowing in the direction from the reference stack 16 to the oscillating stack 20 (i.e., in the +y direction) also produces a sustained gyromagnetic oscillation of the magnetization in the oscillating stack 20 (including both the magnetic layer 28 and the spin torque driven layer 26).

The injected direct current can be coupled to the magnetic oscillator via the electrodes 12, 14, which may comprise an electrically conductive/magnetically non-conductive material such as, for example, copper.

Figure 2:
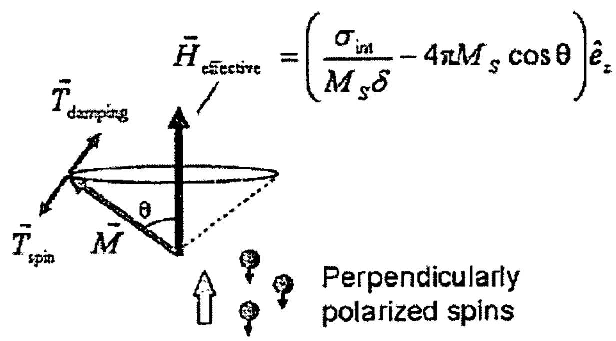
FIG. 2 is a diagram illustrating a physical mechanism for the spin torque generated oscillation.

FIG. 2 illustrates a physical mechanism for the spin torque generated oscillation. Assuming the magnetization of the reference stack 16 is perpendicular (e.g., ±y) direction, the magnetization of the spin torque driven layer 26 experiences a perpendicular field, which is the sum of the interlayer exchange field from the reference stack 16 and the self-demagnetization field. For a given injected current density in the oscillation regime, the spin torque (denoted as $\vec{T}_{spin}$ in FIG. 2) generated by the polarized spin current is opposite to the damping torque (denoted as $\vec{T}_{dumping}$ in FIG. 2) for a non-zero perpendicular field. The balance of the spin torque and the damping torque yields a non-zero tilting angle of the magnetization with respect to the perpendicular axis, along which the effective field is non-zero. The consequence is a sustained magnetization oscillation around the perpendicular field direction.

Figure 3:
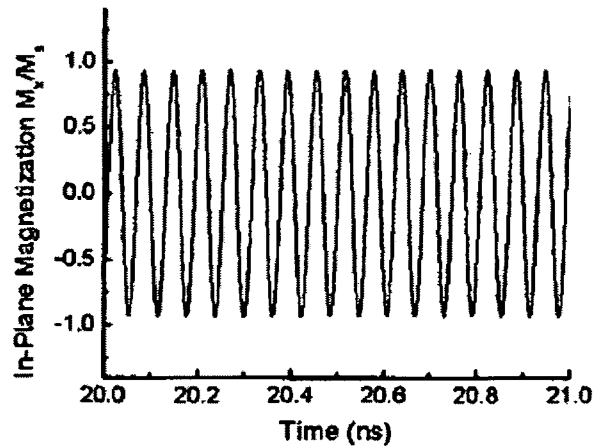
FIG. 3 is a graph showing micromagnetic calculations of the generated magnetic oscillation with a magnetic oscillator according to an embodiment of the present invention.
Figure 4:
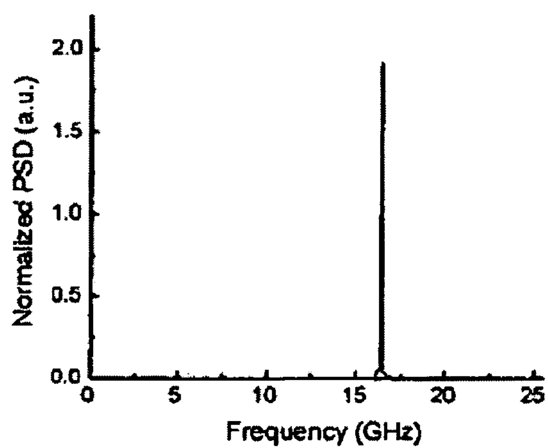
FIG. 4 is a graph showing the power spectral density of the time domain wave of the magnetic oscillator of FIG. 3.

FIG. 3 is a graph showing a micromagnetic calculation result of the oscillation with an oscillator 10 of a lateral dimension 35 nm×35 nm. In this example, the height (or thickness) of the oscillating layer 20 is 35 nm. In addition, the reference stack 16 has an unixial anisotropy energy constant of $K=2\times10^6$ erg/cm$^3$ and a saturation magnetization of $Ms=300$ emu/cm$^3$. The spin torque driven layer 26 is a 2 nm CoFe layer with a saturation magnetization of $Ms=1600$ emu/cm$^3$. The interlayer exchange coupling constant is assumed to be $\sigma=2.4$ erg/cm$^2$ and the damping constant $\alpha=0.02$. FIG. 3 shows the x-component of the magnetization in the spin torque driven layer 26 of the oscillating stack 20 as a function of time. The corresponding frequency spectrum is shown in FIG. 4. The narrow line width in FIG. 4 indicates a very high quality factor for the magnetic oscillator in this example. In the case here, a well-defined uniform magnetization rotation mode is observed the entire oscillation range with the current density below $J=1.73\times10^8$ A/cm$^2$, and the quality factor (Q) is greater than one thousand (i.e., Q>1000).

Figure 5:
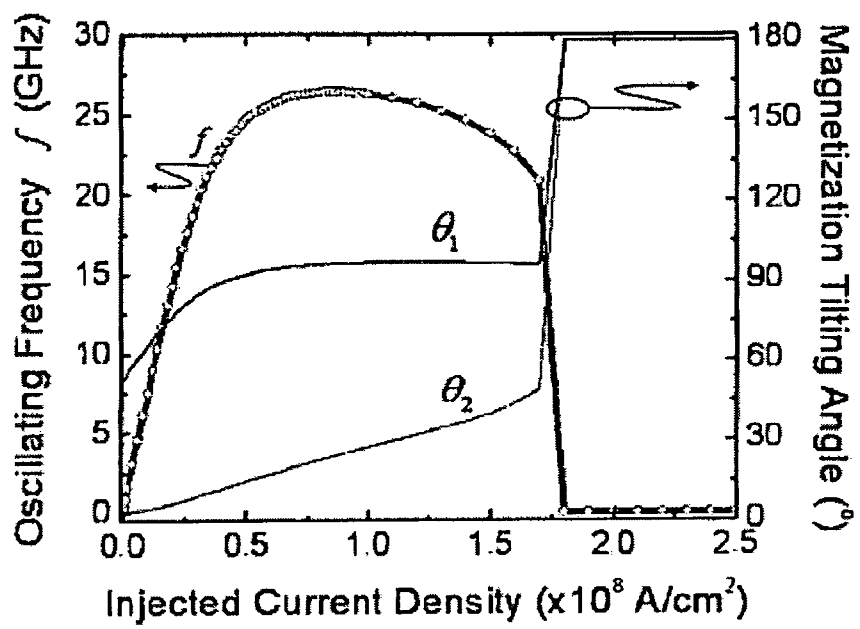
FIG. 5 is a graph showing the calculated current density dependence of the oscillating frequency along with the tilting angle of the magnetization in the spin torque driven layer and the reference stack of a magnetic oscillator according to an embodiment of the present invention.

FIG. 5 shows the calculated current density dependence of the oscillating frequency along with the tilting angle of the magnetization in the spin torque driven layer 26, $\theta_1$, and the reference stack 16, $\theta_2$, with the same magnetic material parameters used in the example of FIGS. 3 and 4. As can be seen in FIG. 5, at small current densities the oscillating frequency linearly increases with increasing current density. Thus, the magnetic oscillator 10 can easily be turned in this range. As the current density reaches relatively high values where the magnetization of the spin torque driven layer 26 completely tilts in the film plane, the oscillating frequency may reach a maximum. In this range, the oscillating frequency is very stable as minor changes in the current have little effect on the oscillating frequency. At even higher currents, as shown in FIG. 5, the oscillating frequency diminishes due to the continued rotation of the magnetization towards the spin polarization direction. When the current reaches a critical value, the magnetization of both layers would irreversibly switch in the perpendicular direction where the oscillation would no longer occur.

Figure 6:
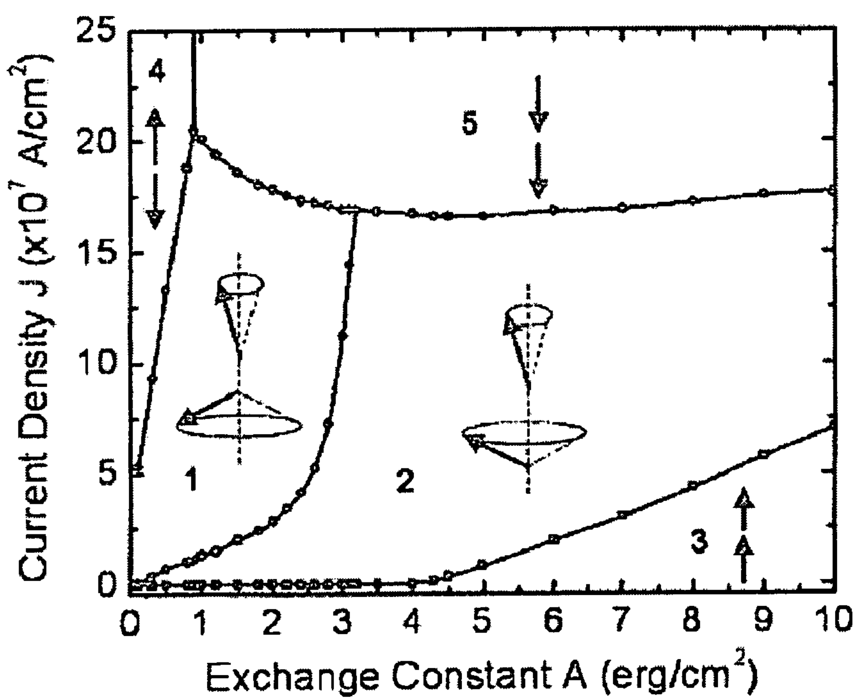
FIG. 6 is a graph illustrated a calculated phase diagram of the magnetization configuration in the oscillating layer as functions of the interlayer exchange coupling and current density of a magnetic oscillator according to an embodiment of the present invention.

FIG. 6 is a calculated phase diagram of the magnetization configuration in the oscillating layer 20 as functions of the interlayer exchange coupling and current density. Steady oscillation only occurs in Regions 1 and 2, where the spin torque driven layer 26 has a non-zero tilting angle. In Region 2, the oscillating frequency is essentially linearly proportional to an increase of the current density, while in Region 1 the frequency-current dependence is rather flat. In Region 3, the interlayer coupling is so strong that a threshold current density is required to yield a non-zero tilting angle for the magnetization of the spin torque driven layer 26. In Region 4, the combination of weak exchange and relatively strong spin torque yields the irreversible magnetization switching only for the spin torque driven layer 26. In Region 5, irreversible magnetization reversal occurs for both layers.

FIG. 1B is a cross-sectional side view of the magnetic oscillator 10 according to another embodiment. The embodiment of FIG. 1B is similar to that of FIG. 1A, except that in the embodiment of FIG. 1B, the magnetic oscillator 10 comprises a perpendicular synthetic antiferromagnetic (SAF) layer 100 for the reference stack as another way of fixing the polarity of the reference stack. As shown in FIG. 1B, the perpendicular SAF layer 100 may comprise include an upper ferromagnetic layer 102 and a lower ferromagnetic layer 104, with a non-magnetic metal layer 106 therebetween. The upper and lower ferromagnetic layers 102, 104 may be polarized perpendicularly relative to the planes of the respective layers, but in opposite directions as shown in FIG. 1B due to antiparallel coupling. The upper ferromagnetic layer 102 may comprise Co, CoFe or Fe, for example. The lower ferromagnetic layer 104 may comprise a Co/Pt or Co/Rd superlattice, or may comprise multiple layers of these materials. Also, the lower ferromagnetic layer may comprise rare earth transition metals such as TbFe, TbCoFe, GdCoFe, etc., for example. The non-magnetic metal layer 106 may comprise Ru, Rd or Cr, for example.

Figure 7:
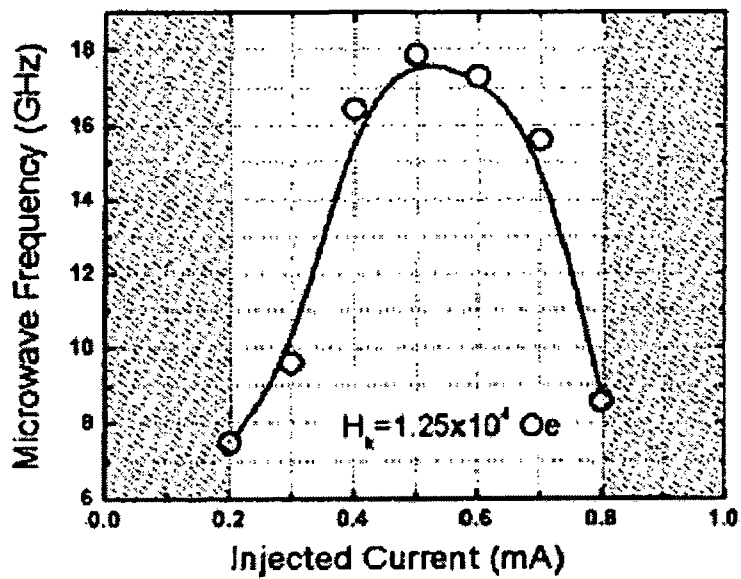
FIG. 7 is a graph showing the relationship of the oscillating frequency as a function of the current magnitude for one embodiment of the magnetic oscillator.

The oscillating frequency of the magnetic oscillator 10 can be varied through a number of means. One way is to adjust the level of the injected direct current. FIG. 7 is a graph showing the relationship of the oscillating frequency as a function of the current magnitude for one embodiment of the magnetic oscillator 10. In this example, perpendicular anisotropy in the oscillating stack 30 is $H_k=1.25\times10^4$ Oe. The shaded region on the left of the graph corresponds to the region where the current magnitude is below the threshold for generating the sustained oscillation, and the shaded region on the right of the graph corresponds to the region where the magnetic switching of the spin torque driven layer 26. Note that in this example there exists a maximum oscillating frequency (approx. 17.5 GHz) at an optimum injection current magnitude (approx. 0.5 mA).

Figure 8:
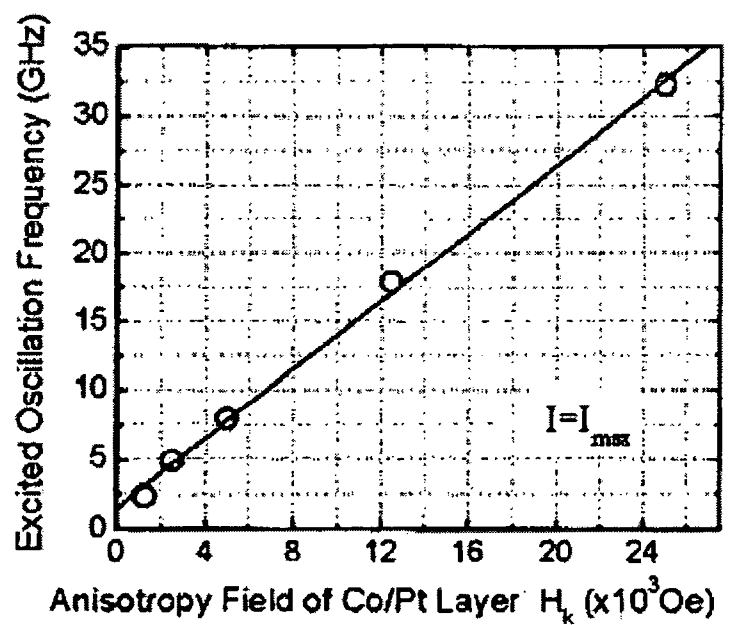
FIG. 8 is a graph showing the relationship between the oscillating frequency and the perpendicular anisotropy in the oscillating stack for one embodiment of the magnetic oscillator.

Another way to vary the oscillating frequency is to vary the perpendicular anisotropy in the oscillating stack 20. FIG. 8 is a graph showing the relationship between the oscillating frequency and the perpendicular anisotropy in the oscillating stack 20 for one embodiment of the magnetic oscillator 10. As can be seen, in some embodiments the oscillating frequency can reach 35 GHz.

Advantageously, the magnetic oscillator 10 may be fabricated using conventional CMOS fabrication techniques (e.g., repeated deposition and patterning of metallic and non-metallic layers). In that way, the magnetic oscillator 10 could be monolithically integrated with peripheral solid state (e.g., CMOS) circuitry.

Figure 9:
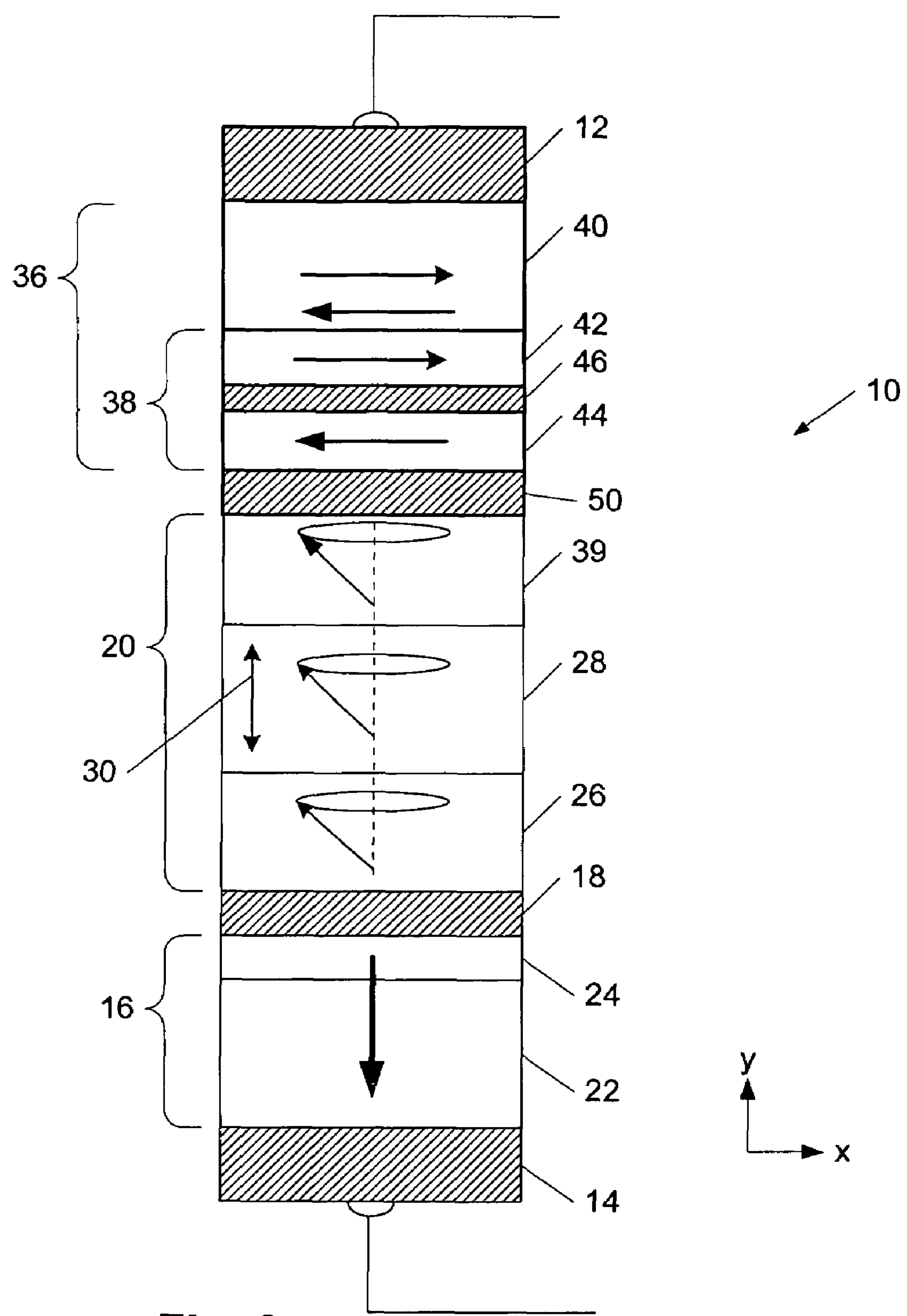
FIG. 9 is a cross-sectional diagram of the magnetic oscillator according to another embodiment of the present invention.

FIG. 9 is a cross-sectional diagram of the magnetic oscillator 10 according to another embodiment of the present invention. The embodiment shown in FIG. 9 is similar to that of FIGS. 1A-1B, except that it additionally includes a sensor stack 36. The sensor stack 36 may sense current or voltage, and thus allow the magnetic oscillator 10 to be used as either a voltage oscillator or current oscillator. In addition, the oscillating stack 20 additionally includes a tunnel magnetoresistance (TMR) enhancing layer 39 formed on the magnetic layer 28 in this example. The TMR enhancing layer 39 may provide adequate interlayer exchange coupling. The TMR enhancing layer 39 may comprise CoFe, CoFeB, NiFe, or composites thereof, for example.

The sensor stack 36 may include, as shown in FIG. 9, a synthetic antiferromagnetic (SAF) reference layer 38 and an anti-ferromagnetic (AFM) layer 40. The SAF reference layer 38 may include an upper ferromagnetic layer 42 and a lower ferromagnetic layer 44, with a non-magnetic metal layer 46 therebetween. The ferromagnetic layers 42, 44 may comprise a ferromagnetic material such as, for example, CoFe, CoFeB, NiFe, or composites thereof. The non-magnetic metal layer 46 may be fabricated from a non-magnetic metal such as, for example, ruthenium (Ru) or rhodium (Rd). The thinness of the non-magnetic metal layer 46 promotes antiferromagnetic exchange between the ferromagnetic layers 42, 44. As a result, the ferromagnetic layers 42, 44 have anti-parallel magnetizations, as shown by the oppositely-directed arrows in FIG. 9. According to various embodiments, the thickness of the non-magnetic metal layer 46 may be about five (5) to ten (10) nm. Further, because the magnetization gyromotion of the oscillating stack 20 is around the perpendicular axis, the magnetization of the sensing stack 36 should be along the horizontal (or x) axis, as shown in FIG. 9.

The AFM layer 40 may be formed adjacent to the SAF reference layer 38 and is for pinning the magnetization of the SAF reference layer 38 such that the direction of the magnetic spin of the SAF reference layer 38 is fixed in the range of several hundred to several thousand Oersted (Oe) in magnetic field. The AFM layer 40 may be fabricated from an anti-ferromagnetic material such as, for example, IrMn, IrPtPd, IrPt, or NiMn, and may have a thickness of, for example, approximately 200 nm. In other embodiments, the sensor stack 36 may eliminate the AFM layer 40 and/or just include the lower ferromagnetic layer 44.

There may also be an interlayer 50 between the oscillating stack 20 and the sensor stack 36. According to various embodiments, the interlayer 50 may be a tunnel junction barrier layer, in which case the tunnel junction barrier interlayer 50 may comprise, for example, AlOx, MgO, or any other material that provides sufficient tunnel magnetoresistance. In other embodiments, the interlayer 50 may be a metallic interlayer, such as copper, for current-perpendicular-to-plane giant magnetoresistance.

FIG. 1C is a cross-sectional view of the magnetic oscillator according to another embodiment of the present invention. The embodiment of FIG. 1C is similar to that of FIG. 1A, except that in the embodiment of FIG. 1C, the polarity of the magnetic layer 22 of the reference stack 16 has both a perpendicular component (i.e., ±y-axis component) and a horizontal (or "in-plane") component (i.e., ±x-axis component) that is in the plane of the magnetic layer 22. This will induce a 2-component magnetization on the spin-torque enhancing layer 24 through exchange coupling. Preferably, the magnetization of the magnetic layer 22 is within 0 to 30 degrees of perpendicular. This may permit read out without a sensor stack as described in the embodiments of FIG. 9, yet still provide sufficient y-axis polarization to induce the oscillating effect when current is injected into the magnetic oscillator.

FIG. 1D is a cross-sectional side-view of the magnetic oscillator 10 according to yet another embodiment. The embodiment of FIG. 1D is similar to that of FIG. 1C, except that in the embodiment of FIG. 1D the reference stack includes a AFM layer 23 having a 2-component polarity (i.e., both ±x and ±y components). The AFM layer 23 may be employed in order to fix the magnetization of the magnetic layer 22.

Figure 10:
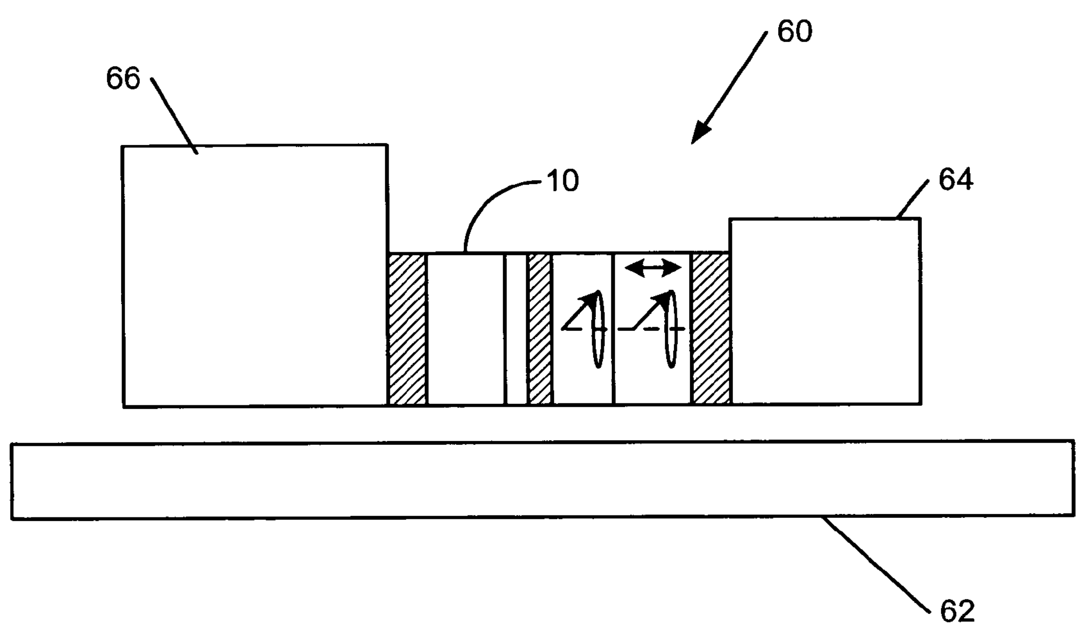
FIG. 10 is a diagram of a magnetic write head, including a magnetic oscillator, according to an embodiment of the present invention, for writing to a magnetic recording medium.

In other embodiments, the magnetic oscillator 10 of the present invention may be used for the generation of a localized field at microwave frequencies, for example, that can be used to assist magnetization reversal. FIG. 10 is a diagram of a magnetic write head 60 for writing to a magnetic recording medium 62 (e.g., a disk) according to such an embodiment. The write head 60 may include, as shown in FIG. 10, a shield 64 and a perpendicular write pole 66. The magnetic oscillator 10 is between the shield 64 and the perpendicular write pole 66. In this embodiment, the magnetic oscillator 10 shown in FIG. 1 is placed horizontally such that it is parallel to the magnetic recording medium 62. When a direct current is injected into the oscillator 10, as explained above, the spin torque driven layer 26 of the oscillating stack 20 (see FIG. 1) generates the magnetic field that assists the reversal of the magnetization of local areas of the medium 62. In such an embodiment, the oscillating frequency of the oscillator 10 is the frequency of the ac magnetic field generated by the spin torque driven layer 26. The ac field frequency can be adjusted, for example, by either changing the injected current level or by changing the perpendicular anisotropy of the magnetic layer 28 of the oscillating stack 20, as described above in connection with FIGS. 7 and 8. In various embodiments, a write head including the magnetic oscillator of the present invention may be part of an integrated read/write head.

FIG. 11 shows the calculated amplitude of the magnetization component perpendicular to the air-bearing-surface (ABS) of the medium 62 in the field generation layer as a function of the injected current level according to one embodiment. The near unit value (at approx. 0.5 mA in this example) indicates that at the oscillating frequency, the oscillating magnetization in the field generating layer is virtually completely in the film plane, maximizing the generated ac field in the recording medium 62.

The generated ac field can assist magnetization reversal under the magnetic field generated by the perpendicular write pole 66 and the trailing shield 64. If the ac field frequency is adequate, magnetization reversal can occur within a fraction of a nanosecond even when the field from the write head 60 is significantly below the coercivity of the medium 62. FIG. 12 is a graph showing the magnetization reversal with an ac field at a particular frequency applied transverse to the anisotropy easy axis 30 (see FIGS. 1A-1B) of the magnetic layer 28.

While several embodiments of the invention have been described, it should be apparent, that various modifications, alterations and adaptations to those embodiments may occur to persons skilled in the art with the attainment of some or all of the advantages of the invention. For example, the various materials and dimensions disclosed herein are meant to be illustrative and not limiting. All such modifications, alterations and adaptations are intended to be covered as defined by the appended claims without departing from the scope and spirit of the present invention.

What is claimed is:

1. A magnetic oscillator comprising:

a magnetic reference stack that comprises:

a reference stack magnetic layer having a material-intrinsic non-in-plane magnetic anisotropy; and a reference stack spin torque enhancing layer exchange coupled to the reference stack magnetic layer;

a magnetic oscillating stack that comprises;

a spin torque driven layer; and an oscillating stack magnetic layer exchange coupled to the spin torque driven layer, wherein the oscillating stack magnetic layer has a strong material-intrinsic magnetic anisotropy with a perpendicular easy axis; and an interlayer between the reference stack and the oscillating stack such that the reference stack and oscillating stack are exchange coupled, and wherein the spin torque driven layer is between the interlayer and the oscillating stack magnetic layer, and wherein the reference stack spin torque enhancing layer is between the reference layer magnetic stack and the interlayer, wherein the reference stack has a sufficient perpendicular magnetic anisotropy such that the oscillating stack produces sustained gyromagnetic oscillation when the oscillating stack and the reference stack have opposite perpendicular magnetizations, and when there is a direct current flowing in the magnetic oscillator from the oscillating stack to the reference stack.

2. The magnetic oscillator of claim 1, wherein the oscillating stack is also for producing sustained gyromagnetic oscillation when the oscillating stack and the reference stack are magnetized in the same perpendicular direction, and when there is a direct current flowing in the magnetic oscillator from the reference stack to the oscillating stack.

3. The magnetic oscillator of claim 2, wherein the magnetic reference stack comprises a synthetic antiferromagnetic layer with a perpendicular magnetic anisotropy.

4. The magnetic oscillator of claim 2, wherein the magnetic reference stack comprises a synthetic antiferromagnetic layer having a perpendicular magnetic anisotropy component and an in-plane magnetic anisotropy component.

5. The magnetic oscillator of claim 2, wherein the interlayer comprises an electrically conductive/magnetically non-conductive material.

6. The magnetic oscillator of claim 2, wherein the interlayer comprises a metallic layer.

7. The magnetic oscillator of claim 2, wherein the interlayer comprises a tunnel barrier layer.

8. The magnetic oscillator of claim 2, further comprising a sensor stack.

9. The magnetic oscillator of claim 8, wherein the oscillating stack is between the reference stack and the sensor stack.

10. The magnetic oscillator of claim 9, wherein the sensor stack comprises:

a synthetic antiferromagnetic reference layer; and an antiferromagnetic layer adjacent to the synthetic antiferromagnetic reference layer.

11. The magnetic oscillator of claim 9, wherein the oscillating stack further comprises a TMR enhancing layer.

12. The magnetic oscillator of claim 11, further comprising a secondary interlayer between the oscillating stack and the sensor stack.

13. The magnetic oscillator of claim 12, wherein the secondary interlayer comprises a metallic layer.

14. The magnetic oscillator of claim 12, wherein the secondary interlayer comprises a tunnel barrier layer.

15. The magnetic oscillator of claim 2, further comprising a first electrode adjacent to the oscillating stack and a second electrode adjacent to the reference stack, wherein the first and second electrodes are for coupling the direct current to the magnetic oscillator.

16. The magnetic oscillator of claim 1, wherein the reference stack magnetic layer has a material-intrinsic tilting magnetic anisotropy.

17. The magnetic oscillator of claim 1, wherein the reference stack magnetic layer has a material-intrinsic perpendicular magnetic anisotropy.

18. A magnetic write head for writing data to a magnetic recording medium comprising:

a perpendicular write pole;

a shield; and a magnetic oscillator between the perpendicular write pole and the shield, wherein the magnetic oscillator comprises:

a magnetic reference stack that comprises:

a reference stack magnetic layer having a material-intrinsic non-in-plane magnetic anisotropy; and a reference stack spin torque enhancing layer exchange coupled to the reference stack magnetic layer;

a magnetic oscillating stack that comprises; and a spin torque driven layer; and an oscillating stack magnetic layer exchange coupled to the spin torque driven layer, wherein the oscillating stack magnetic layer has a strong material-intrinsic magnetic anisotropy with a perpendicular easy axis;

an interlayer between the reference stack and the oscillating stack such that the reference stack and oscillating stack are exchange coupled, and wherein the spin torque driven layer is between the interlayer and the oscillating stack magnetic layer, and wherein the reference stack spin torque enhancing layer is between the reference layer magnetic stack and the interlayer, wherein the reference stack has a sufficient perpendicular magnetic anisotropy such that the oscillating stack produces sustained gyromagnetic oscillation when the oscillating stack and the reference stack have opposite perpendicular magnetizations, and when there is a direct current flowing in the magnetic oscillator from the oscillating stack to the reference stack.

19. The magnetic write head of claim 18, wherein the oscillating stack is also for producing sustained gyromagnetic oscillation when the oscillating stack and the reference stack are magnetized in the same perpendicular direction, and when there is a direct current flowing in the magnetic oscillator from the reference stack to the oscillating stack.

20. The magnetic write head of claim 19, wherein the magnetic reference stack comprises a synthetic antiferromagnetic layer with a perpendicular magnetic anisotropy.

21. The magnetic write head of claim 19, wherein the magnetic reference stack comprises a synthetic antiferromagnetic layer having a perpendicular magnetic anisotropy component and an in-plane magnetic anisotropy component.

22. The magnetic write head of claim 19, wherein the interlayer comprises a metallic layer.

23. The magnetic write head of claim 19, wherein the interlayer comprises a tunnel barrier layer.

24. The magnetic write head of claim 18, wherein the reference stack magnetic layer has a material-intrinsic tilting magnetic anisotropy.

25. The magnetic write head oscillator of claim 18, wherein the reference stack magnetic layer has a material-intrinsic perpendicular magnetic anisotropy.

26. A method of producing gyromagnetic oscillations comprising:

injecting a direct current through a magnetic oscillator, wherein the magnetic oscillator comprises:

a magnetic reference stack that comprises:

a reference stack magnetic layer having a material-intrinsic non-in-plane magnetic anisotropy; and a reference stack spin torque enhancing layer exchange coupled to the reference stack magnetic layer;

a magnetic oscillating stack that comprises; and a spin torque driven layer; and an oscillating stack magnetic layer exchange coupled to the spin torque driven layer, wherein the oscillating stack magnetic layer has a strong material-intrinsic magnetic anisotropy with a perpendicular easy axis, and wherein the reference stack spin torque enhancing layer is between the reference layer magnetic stack and the interlayer;

an interlayer between the reference stack and the oscillating stack such that the reference stack and oscillating stack are exchange coupled, and wherein the spin torque driven layer is between the interlayer and the oscillating stack magnetic layer, wherein the reference stack has a sufficient perpendicular magnetic anisotropy such that the oscillating stack produces sustained gyromagnetic oscillation when the oscillating stack and the reference stack have opposite perpendicular magnetizations, and when there is a direct current flowing in the magnetic oscillator from the oscillating stack to the reference stack.

27. The method of claim 26, wherein injecting the direct current includes injecting the direct current when the oscillating stack and the reference stack have opposite perpendicular magnetizations, and wherein the injected direct current flows from the oscillating stack to the reference stack.

28. The method of claim 26, wherein injecting the direct current includes injecting the direct current when the oscillating stack and the reference stack magnetized in the same perpendicular direction, and wherein the injected direct current flows from the reference stack to the oscillating stack.

29. The method of claim 26, wherein the magnetic oscillator is part of a magnetic write head for writing to an adjacent magnetic recording medium, and wherein the method further comprises:

generating, by the magnetic oscillator, because of the injected current, a high frequency AC magnetic field that assists a reversal of the magnetization of a local area of the magnetic recording medium.

30. The method of claim 29, wherein the frequency of the high frequency AC magnetic field corresponds to a frequency of the gyromagnetic oscillations of the magnetic oscillator.

31. The method of claim 26, wherein the reference stack magnetic layer has a material-intrinsic tilting magnetic anisotropy.

32. The method of claim 26, wherein the reference stack magnetic layer has a material-intrinsic perpendicular magnetic anisotropy.

* * * * *

UNITED STATES PATENT AND TRADEMARK OFFICE

CERTIFICATE OF CORRECTION

PATENT NO. : 7,616,412 B2
APPLICATION NO. : 11/490882
DATED : November 10, 2009
INVENTOR(S) : Xiaochun Zhu et al.

It is certified that error appears in the above-identified patent and that said Letters Patent is hereby corrected as shown below:

Title Page; item (73);

ASSIGNEE

Delete "Carnegie Melon University" and substitute therefore --Carnegie Mellon University--.

Signed and Sealed this

Sixteenth Day of March, 2010

David J. Kappos

*Director of the United States Patent and Trademark Office*